(12) United States Patent
Roewer (10) Patent No.: US 7,654,456 B2
(45) Date of Patent: Feb. 2, 2010

(54) METHOD AND SYSTEM FOR MANAGING SUPPLIES AND PERFORMANCE IN A COLLISION CENTER

(75) Inventor: Robert M. Roewer, West Bloomfield, MI (US)

(73) Assignee: BASF Corporation, Southfield, MI (US)

(*) Notice: Subject to any disclaimer, the term of this patent is extended or adjusted under 35 U.S.C. 154(b) by 427 days.

(21) Appl. No.: 11/290,179

(22) Filed: Nov. 30, 2005

(65) Prior Publication Data

US 2007/0119916 A1 May 31, 2007

(51) Int. Cl.
- G06F 19/00 (2006.01)
- G06Q 30/00 (2006.01)
- G06Q 90/00 (2006.01)
- G06F 7/00 (2006.01)
- G06F 9/46 (2006.01)
- G06F 15/02 (2006.01)
- G06F 11/34 (2006.01)
- H04M 3/51 (2006.01)

(52) U.S. Cl. .......... 235/385; 235/376; 705/11; 705/9

(58) Field of Classification Search .......... 235/385, 235/375, 382, 492, 376; 705/8, 9, 10, 11, 705/1; 340/825.49, 568.1
See application file for complete search history.

(56) References Cited

U.S. PATENT DOCUMENTS

| | | | |
|---|---|---|---|
| 5,317,503 A * | 5/1994 | Inoue | 700/90 |
| 5,317,506 A | 5/1994 | Coutré et al. | |
| 5,909,669 A * | 6/1999 | Havens | 705/11 |
| 5,918,191 A | 6/1999 | Patel | |
| 6,052,631 A * | 4/2000 | Busch et al. | 705/1 |
| 6,188,991 B1 | 2/2001 | Rosenweig et al. | |
| 6,263,322 B1 * | 7/2001 | Kirkevold et al. | 705/400 |
| 6,311,162 B1 * | 10/2001 | Reichwein et al. | 705/1 |
| 6,339,764 B1 | 1/2002 | Livesay et al. | |
| 6,430,536 B2 | 8/2002 | Irving et al. | |
| 6,609,050 B2 | 8/2003 | Li | |
| 6,650,225 B2 | 11/2003 | Bastian et al. | |
| 6,832,205 B1 * | 12/2004 | Aragones et al. | 705/11 |
| 7,082,404 B2 * | 7/2006 | Calderaro et al. | 705/11 |
| 7,293,706 B2 * | 11/2007 | Schulz et al. | 235/385 |
| 7,296,736 B2 * | 11/2007 | Yamagiwa | 235/385 |
| 2003/0050830 A1 * | 3/2003 | Troyer | 705/11 |

(Continued)

Primary Examiner—Thien M. Le
Assistant Examiner—Thien T Mai
(74) Attorney, Agent, or Firm—Howard & Howard Attorneys PLLC (57) ABSTRACT

A method and system for measuring performance and ordering supplies in a collision center includes an identification reader for reading product identification tags corresponding products removed from a supply of products. The identification reader also reads a repair order identification tag corresponding to a repair order of a vehicle under repair and a technician identification tag corresponding to a technician using the product(s) to repair the vehicle. The system further includes a computer having a plurality of database for storing repair order data, technician data, benchmark data, and inventory data. The computer receives data from the identification reader and computes a performance level of the technician by comparing the product(s) used by the technician to a standard benchmark. The computer also analyzes the inventory data and automatically generates a supply order for products that fall below an inventory level. The supply order is electronically sent to a supplier.

9 Claims, 4 Drawing Sheets

U.S. PATENT DOCUMENTS

| | | |
|---|---|---|
| 2003/0078798 A1 | 4/2003 | Zaks et al. |
| 2003/0111525 A1* | 6/2003 | Sweeney et al. ............ 235/376 |
| 2003/0130820 A1 | 7/2003 | Lane, III |
| 2003/0174046 A1 | 9/2003 | Abrams |
| 2005/0096795 A1 | 5/2005 | Krieter et al. |
| 2005/0216326 A1* | 9/2005 | Inoue et al. .................... 705/9 |

* cited by examiner

METHOD AND SYSTEM FOR MANAGING SUPPLIES AND PERFORMANCE IN A COLLISION CENTER

BACKGROUND OF THE INVENTION

1. Field of the Invention

The invention relates to a method and system for managing supplies and performance in a collision center.

2. Description of the Related Art

Various systems and methods for managing supplies and/or performance are known to those in the related art. Examples of such systems and methods are disclosed in United States Patent Application Publication No. 2003/0130820 (the '820 publication) and U.S. Pat. No. 6,575,365 (the '365 patent).

The '820 publication discloses a system and method for managing work orders for performing maintenance tasks. The system and method logs the start and stop time that a technician works on one of the work orders. The total elapsed time taken by the technician to complete the work order is calculated and compared with benchmarks or other work orders or other technicians. From this comparison, a productivity and efficiency of the technician is measured based solely on the time taken by the technician to perform the work order. The '820 publication does not disclose a system or method to measure productivity and efficiency of the technician based on factors other than the time taken to perform the work order.

The '365 patent discloses a system and method for providing supplies to a collision center. The system and method involves scanning bar codes which are disposed on bins in the collision center. Each bar code corresponds to the products stored in the bins. An order is generated for the products whose bar codes is scanned. The order is transmitted from the collision center to an Internet web site. The order is then transmitted from the web site to a supplier. Unfortunately, the system and method disclosed by the '365 patent requires a person to perform an inventory check of the supplies from time-to-time, thus costing the collision center or the supplier additional labor time. Furthermore, the '365 patent does not disclose the use of radio frequency identification (RFID) tags for identifying the products stored in the bins.

SUMMARY OF THE INVENTION AND ADVANTAGES

The subject invention discloses a method of computing performance in a collision center. The method includes the step of removing at least one product from a supply of products. The product is for use by a technician in repairing a vehicle. The method further includes the step of reading a product identification corresponding to a type and/or a quantity of each product removed from the supply of products. A repair order identification corresponding to a repair order for the vehicle under repair is read. The repair order includes a description of repairs to be performed. The method also includes the step of reading a technician identification corresponding to the technician using the at least one product to repair the vehicle. The identifications are transmitted to a computer having a database. A standard benchmark indicating type and/or quantity of each product recommended to perform repairs described in the repair order from the database is retrieved from the database. The method further includes the step of computing a performance level of the technician by comparing the type and/or quantity of each product used by the technician to the standard benchmark.

The subject invention also discloses a system for measuring performance in a collision center. The system includes an identification reader for reading a product identification corresponding to a type and/or a quantity of a product removed from a supply of products. The identification reader also reads a repair order identification corresponding to a repair order of a vehicle under repair and a technician identification corresponding to a technician using the product to repair the vehicle. The system further includes a repair order database for storing repair orders. Each repair order describes repairs to be performed to the vehicle. The system further includes a benchmark database. The benchmark database stores standard benchmarks indicating type and/or quantity of each product recommended to perform repairs described in each repair order. A computer is in communication with the identification reader and the databases. The computer receives the identifications from the identification readers and computes a performance level of the technician by comparing the type and/or quantity of each product used by the technician to the standard benchmark.

The subject invention further provides a method of managing a supply of products in a collision center. The method includes the step of removing at least one product from a supply of products. The at least one product is for use by a technician in repairing a vehicle. A product identification is read from a product radio-frequency identification (RFID) tag corresponding to a type and quantity of each product removed from the supply of products. The method continues by transmitting the product identification to a computer having an inventory database. An inventory level of the inventory database is updated for each product removed from the supply of products in response to receiving the product information read from the RFID tags. The method includes the step of sending a supply order electronically to a supplier based on the inventory level of each product in the supply of products.

The subject invention also provides a method for ordering supplies for a collision center from at least one supplier. The method includes the step of reading a product identification code from a product RFID tag corresponding to each of the supplies to be ordered. The product identification code is transmitted t from the collision center to an order manager wherein the order manager. The order manager accommodates a plurality of suppliers. The method further includes the step of generating an order based on the product identification code transmitted to the order manager. The method also includes the step of sending the order to at least one of the suppliers.

The system and method of the present invention provide advantages over the prior art. A first advantage is that consumption of supplies to complete a repair order may be utilized as an element of technician performance, instead of simply the time needed to complete the repair order. A second advantage is that inventory levels of products are automatically adjusted by reading the RFID tags of the products as the products are removed for use in vehicle repair. A supply order is then automatically generated based on the inventory level without needed to perform a routine "inventory check". These advantages aid in the overall performance of the collision center by allowing technicians to focus on making quality vehicle repairs with efficient use of materials without having to waste valuable time ordering and reordering supplies.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a system 10 and methods 100, 200, 300 for managing supplies and computing performance in a collision center 12 are shown.

Figure 1:
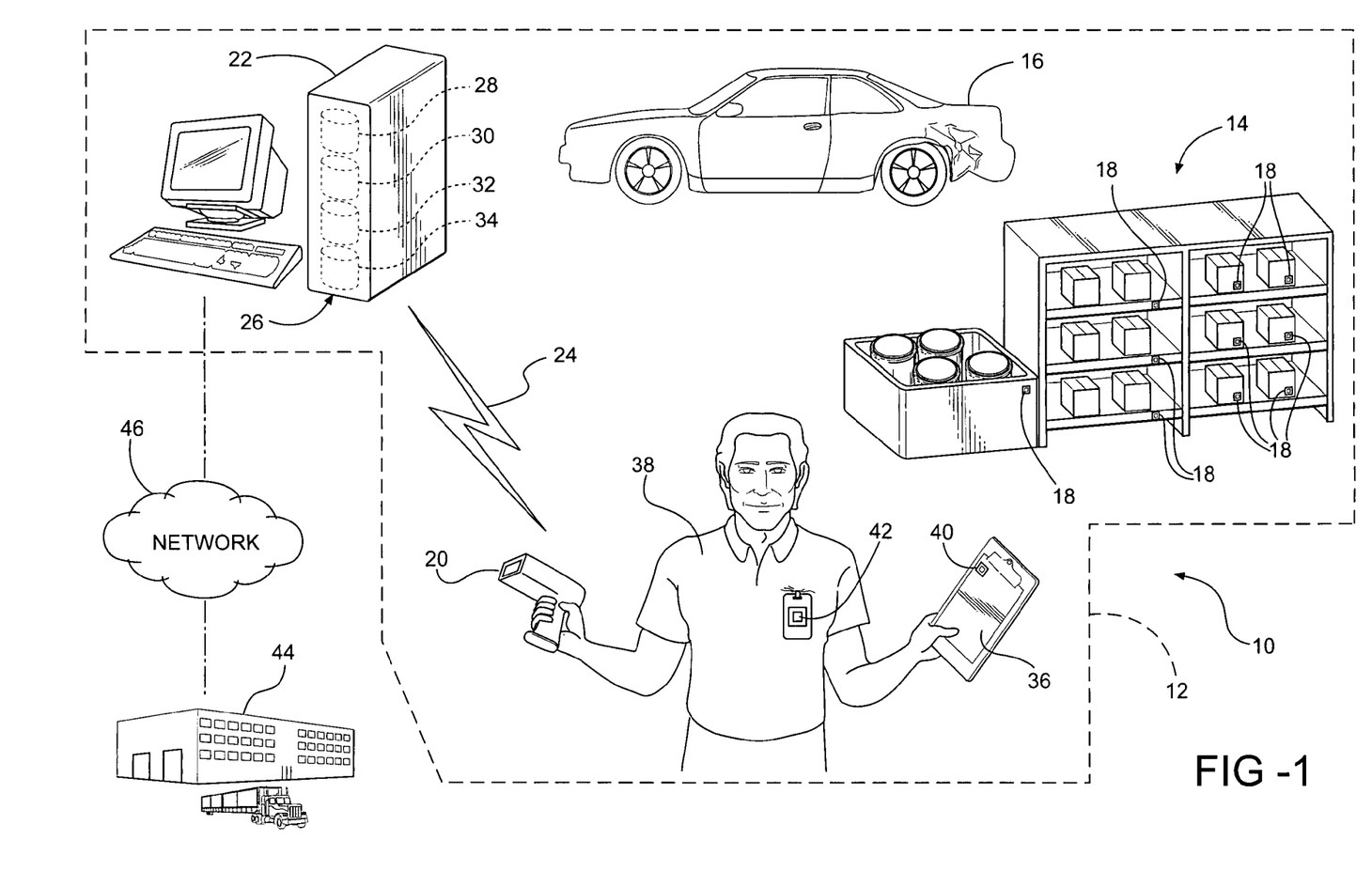
FIG. 1 is a schematic view of a system according to the present invention.

Referring to FIG. 1, the collision center 12 may be an automotive repair facility, a bump shop, or a repair node at an automotive manufacturing plant. However, those skilled in the art realize that the concepts disclosed herein may be applied to other facilities, such as, but not limited to, a home, a commercial business, an industrial business, or any other facility that consumes products in the course of its operations. However, for the purposes of convenience, and to illustrate the most preferred embodiment of the invention, the term collision center 12 will be used throughout this disclosure.

The collision center 12 of the preferred embodiment maintains a supply of products 14 for use in repairing damaged vehicles 16. For example, these products may include vehicle components (bumpers, mirrors, etc.), paint, sandpaper, masking tape, nuts, bolts, etc.

In the preferred embodiment, each product in the supply of products 14 is assigned a product code. The product code corresponds to a type of each product. The term "type" of product may include, but is not limited to, the description, size, and/or brand of the product. The product code may be, but is not limited to, a universal product code (UPC) as is well known to those skilled in the art. A product identification 18 also corresponds with each product in the supply of products 14. Each product identification 18 encodes the product code of corresponding product. The product identification 18 may also include a quantity of each product. The product identification 18 may be affixed directly to the product, attached to a shelf holding the product, attached to a bin holding a plurality of the product, etc.

In the preferred embodiment, the product identification 18 is a radio frequency identification (RFID) tag. The RFID tag stores data which may be transferred via radio waves. The data of the RFID tag may be a unique serial number that corresponds to the type and/or quantity of the product. Alternatively, the data of the RFID tag may be text (i.e., a string) that describes the type and/or quantity of the product.

RFID tags may be written to or read from without making physical contact between the RFID tag and a RFID transceiver. The RFID tag is especially suited to applications within the collision center 12, since customized supplies, such as uniquely colored paint, must be formulated. For example, one RFID tag, used as the product identification 18, could be used to represent the contents of a can of paint. The data encoded on the RFID tags may list 3.4 liters of Type A base, 0.3 liters of red pigment, 0.4 liters of yellow pigment, and 23 milliliters of metallic flake. Of course, multiple RFID tags could be used to represent the individual contents of the can of paint.

In an alternative embodiment, the product identification 18 is a bar code, which is well known in the art. The bar code may be a "one-dimensional" bar code that encodes the unique serial number or a "two-dimensional" bar code that encodes text that describes the type and/or quantity of the product.

The system 10 includes an identification reader 20. The identification reader 20 is capable of reading the product code from the product identification 18 corresponding to the type and/or quantity of the product removed from a supply of products 14. The kind of identification reader 20 is dependent on the form or forms of product identification 18 used in the collision center 12. For example, in the preferred embodiment, where the product identifications 18 are RFID tags, an RFID reader may be implemented as the identification reader 20. RFID readers are known to those skilled in the art and are manufactured by such Intermec Technologies Corporation headquartered in Everett, Wash., Symbol Technologies, Inc., headquartered in Holtsville, N.Y., or ThingMagic, headquartered in Cambridge, Mass. Alternatively, the identification reader 20 may be a barcode reader, a combination RFID/barcode reader, or a manual data entry device. Furthermore, those skilled in the art realize that RFID and barcode readers may be integrated with other electronic devices, such as Personal Digital Assistants (PDAs) or mobile/cellular telephones.

In the preferred embodiment, the identification reader 20 is one or more portable devices that can be easily moved around the collision center 12. However, the identification reader 20 may alternatively be one or more fixed devices located at various fixed locations in the collision center 12.

The system 10 also includes a computer 22 in communication with the identification reader 20. In the preferred embodiment, a wireless network 24 is utilized to provide communication between the handheld identification reader 20 and the computer 22. The wireless network 24 is preferably a radio frequency (RF) network (e.g. 802.11, cellular telephone, PCS, Bluetooth, etc.). However, other forms of wireless networking may be implemented. Alternatively, the communication between the computer 22 and the identification reader 20 may be accomplished by hardwired connections, such as, but not limited to, placing the identification reader 20 in a "cradle" connected to the computer 22 for a transfer of data to and from the computer 22.

The computer 22 is in communication with at least one database 26 for storing data. In the preferred embodiment, the at least one database 26 is stored in the computer 22. It is preferred that the at least one database 26 include a plurality of databases that are linked to each other. This configuration is well known to those skilled in the art as a "relational database".

In the preferred embodiment, the computer 22 and the at least one database 26 are located at the collision center 12 (i.e., a client based database). However, in alternative embodiments, the computer 22 and/or the databases 26 may be located at remote locations distant from the collision center 12 (i.e., a web based database).

The at least one database 26 preferably includes a repair order database 28. The repair order database 28 stores repair orders 36. Each repair order 36 describes the repairs to be performed to the vehicle 16 as well as information about the vehicle 16. For example, one repair order 36 may include descriptions such as "replace rear bumper", "bump out driver's side rear quarter panel", and "repaint driver's side rear quarter panel". The repair order 36 may also include vehicle make, model, model year, manufacture date, vehicle identification number (VIN), color, etc.

Each repair order 36 is identified by a repair order code. This repair order code is typically a unique number for differentiating one repair order 36 from all other repair orders 36. In the preferred embodiment, each repair order 36 is printed out for convenient use by a technician 38 repairing the vehicle 16. The repair order 36 includes a repair order identification 40 that encodes the repair order 36 code. The repair order identification 40 is preferably an RFID tag, but may alternatively be a barcode or other suitable identifying device.

The at least one database 26 further preferably includes a technician performance database 30. The technician performance database 30 may store information such as, but not limited to, an overall performance rating, a time rating, a quality rating, and a material consumption rating. Each technician 38 in the collision center 12 is also uniquely identified with a technician code which is stored in the technician performance database 30. As with the product and repair order codes described above, the technician code is preferably encoded in a technician identification 42, such as an RFID tag, bar code, etc. The technician identification 42 may be attached to an identification badge worn by the technician 38 or by other suitable techniques.

The at least one database 26 also preferably includes a benchmark database 32. The benchmark database 32 stores standard benchmarks indicating type and/or quantity of each product recommended to perform repairs described in each repair order 36. For example, for the repair "repaint driver's side rear quarter panel" of a black 2003 Lincoln LS, the standard benchmark may be "one roll of 2 inch wide masking tape", "4.3 liters of paint", and "300 milliliters of metallic flake". These standard benchmarks may be fixed national averages, developed, for example, by industry standards organizations, insurance company requirements, or by past experience of the collision center 12. Moreover, the standard benchmarks may be developed from data from other collision centers for "collision center to collision center" comparison.

The at least one database 26 further preferably includes an inventory database 34. The inventory database 34 stores inventory levels corresponding to each product in the supply of products 14. In addition, the inventory database 34 may also include a reorder level for each product in the supply of products 14. When the inventory level for a product is equal to or less than the reorder level, then the product should be reordered to avoid running out of the item, thus causing delays in the repair of vehicles 16 in the collision center 12.

Figure 2:
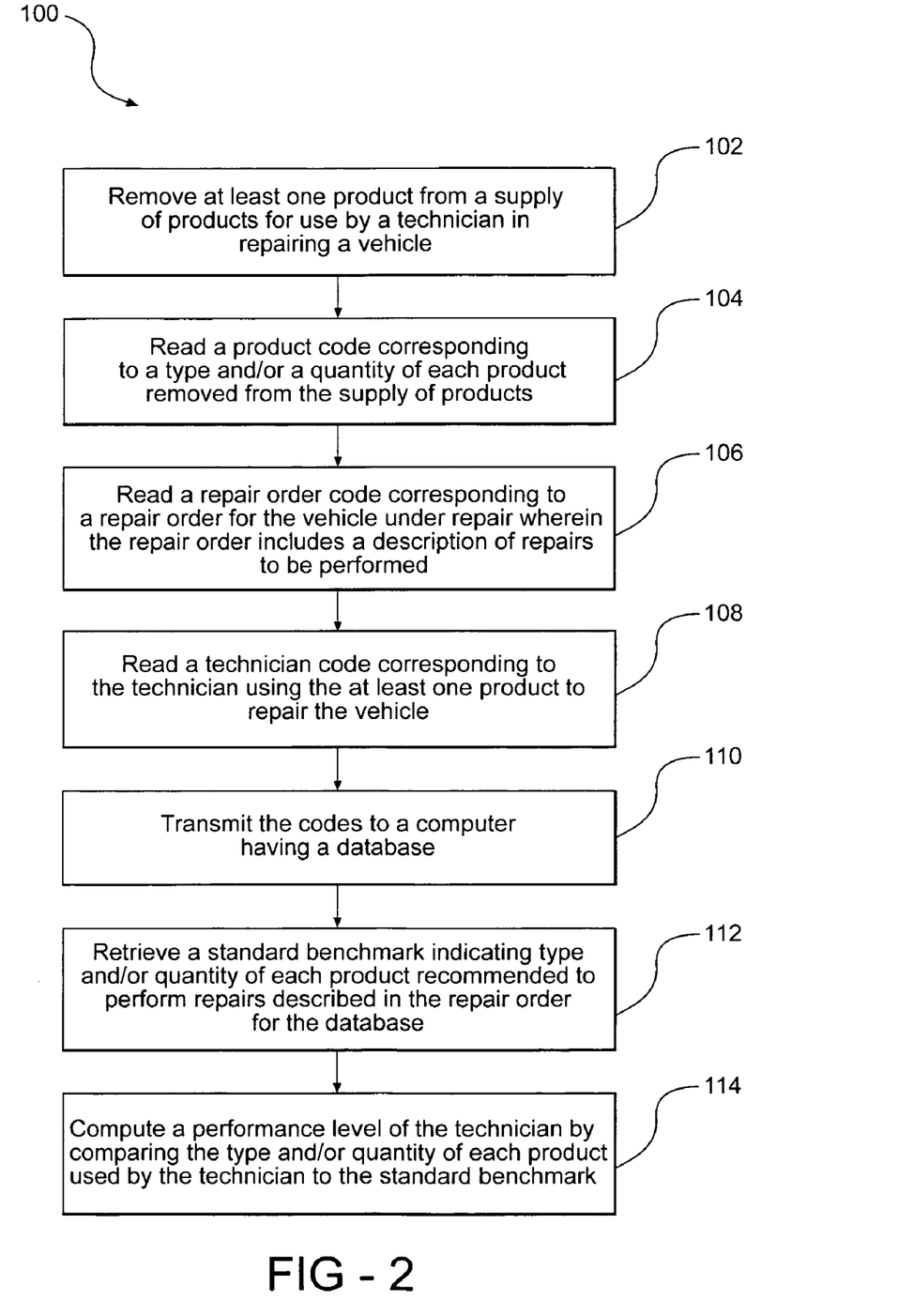
FIG. 2 is a block diagram of the steps of a first method of the subject invention.

Referring now to FIG. 2, a first method 100 of the subject invention includes the step of removing 102 at least one product from the supply of products 14 for use by one of the technicians 38 in repairing a vehicle 16. The technician 38 or another individual may remove the products manually from the supply of products 14. Alternatively, the products may be removed automatically using an automated storage and retrieval system (AS/RS) or other similar devices as are known to those skilled in the art.

The first method 100 further includes the step of reading 104 the product identification 18 corresponding to a type and/or a quantity of each product removed from the supply of products 14. Preferably, the product identification 18 is an RFID tag and is quickly read using the identification reader 20. Alternatively the product identification 18 may be a barcode. Furthermore, the product code could be entered manually using a PDA or other like device. Obviously, this step could involve reading the product identifications 18 for a plurality of products.

The first method 100 continues with reading 106 the repair order identification 40 corresponding to a repair order 36 for the vehicle 16 under repair. As described above, the repair order 36 includes a description of repairs to be performed. Next, the first method 100 progresses by reading 108 the technician identification 42 corresponding to the technician 38 using the at least one product to repair the vehicle 16. The repair order identification 40 and technician identification 42 are readable by the identification reader 20.

Next, the identifications 18, 40, 42 are transmitted 110 to the computer 22. The identifications 18, 40, 42 are related to one another; the product identifications 18 correspond to the products being required by the repair order 36 and the technicians identification 40, 42 corresponds to the technician 38 performing the work required by the repair order 36. The computer 22 is in communication with the at least one databases 26, including the inventory database 34, the repair order database 28, the technician performance database 30, and the benchmark database 32.

The computer 22 then retrieves 112 a standard benchmark from the benchmark database 32 indicating the type and/or quantity of each product recommended to perform the repairs described in the repair order 36. This standard benchmark is preferably predetermined data representing the "best practices" for the collision center 12.

The first method 100 continues with the step of computing 114 a performance level of the technician 38. This performance level may be based on several indicators of technician 38 performance. One such indicator may be the material consumption rating and is computed by comparing the type and/or quantity of each product used by the technician 38 to the standard benchmark.

The first method 100 may also include the step of computing an inventory level of each product of the supply of products 14. As products are removed from the supply of products 14 for use in repairing vehicle 16, the inventory level of each product is appropriately decremented by quantity of product used. Conversely, as new products are received from a supplier 44 or unused products are returned to the supply of products 14 by the technician 38, the inventory level of each product is appropriately incremented. Therefore, the product database provides an accurate representation of each product currently on hand at the collision center 12.

The first method 100 may further include the step of computing a product cost for the repair order 36. This computation is accomplished by accessing cost information from the product database and summing the costs of products actually removed for use (and not returned) by the technician 38 in repairing the vehicle 16. As such, the owner of the vehicle 16 may receive an actual, itemized billing of exactly what products were used in repair of their vehicle 16, instead of a mere estimation of product costs.

Figure 3:
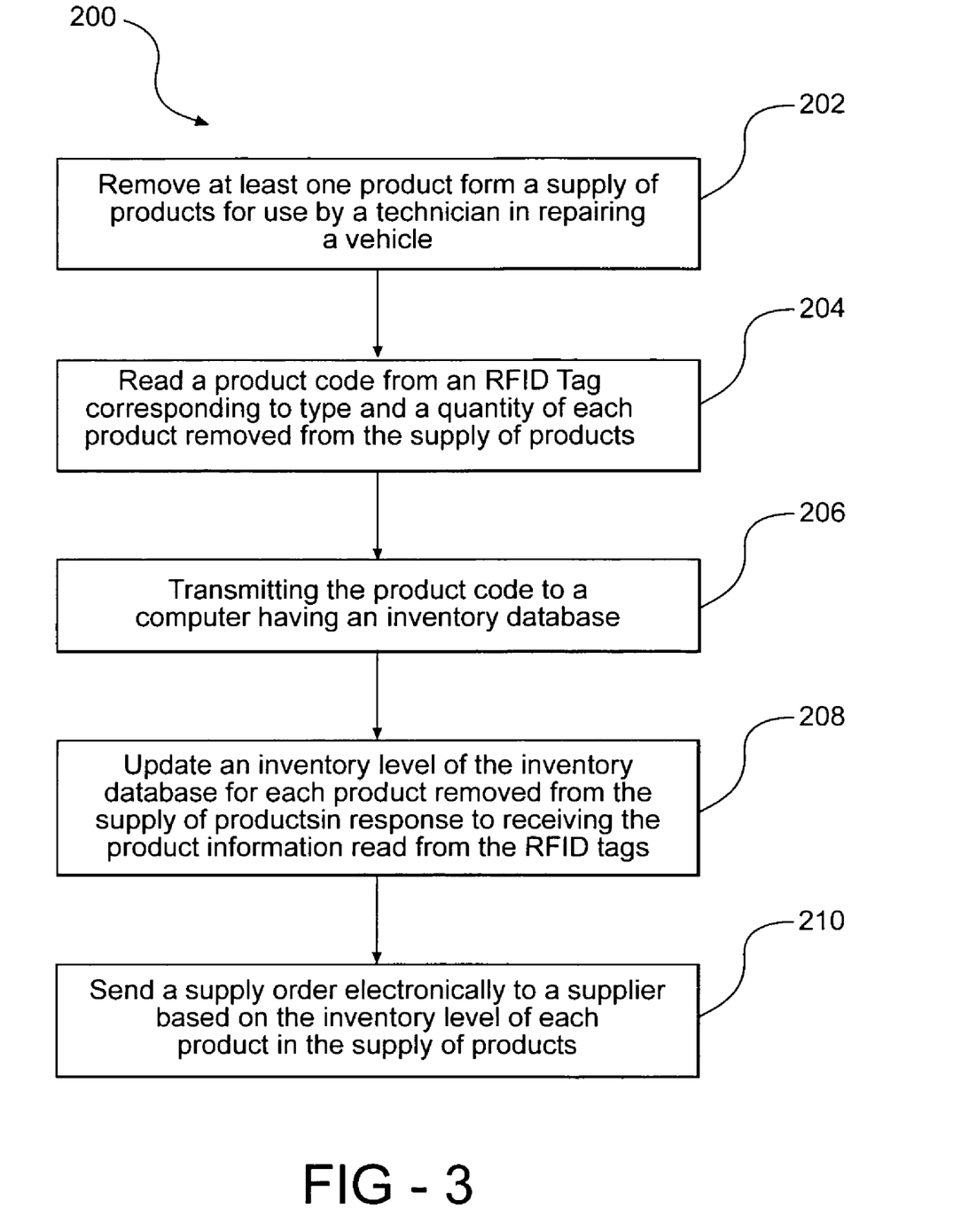
FIG. 3 is a block diagram of the steps of a second method of the subject invention.

Referring to FIG. 3, a second method 200 includes the step of removing 202 at least one product from the supply of products 14 for use by the technician 38 in repairing a vehicle 16. The second method 200 continues with the step of reading 204 a product identification 18 from a product RFID tag corresponding to a type and quantity of each product removed from the supply of products 14. The identification reader 20 is used to read the RFID tag.

Next, the product information is transmitted 206 the product identification 18 to the computer 22. The computer 22 is in communication with the inventory database 34. The inventory level of the inventory database 34 is updated 208 for each product removed from the supply of products 14 in response to receiving the product information read from the RFID tags. Specifically, the inventory level of each product is decremented (i.e., reduced) for each product removed.

As mentioned previously, the inventory database 34 includes a reorder level for each product. Once the inventory level for a product is equal to or less than the reorder level, the second method 200 continues by sending 210 a supply order to a supplier 44. In the preferred embodiment, the supply order is preferably transmitted electronically from the collision center 12 to the supplier 44 via a network 46, such as the Internet. Those skilled in the art realize numerous implementations of the network 46, such as, but not limited to, Ethernet, DSL, ISDN, cable TV, 802.11, and cellular telephone. In a first alternative embodiment, the supply order may be transmitted to the supplier 44 via telephone, fax, or printed and mailed to the supplier 44. In a second alternative embodiment, as shown in FIG. 5, the supply order may be transmitted to an order manager, who will break the supply order up into smaller orders which are each transmitted to an appropriate supplier 44.

Figure 4:
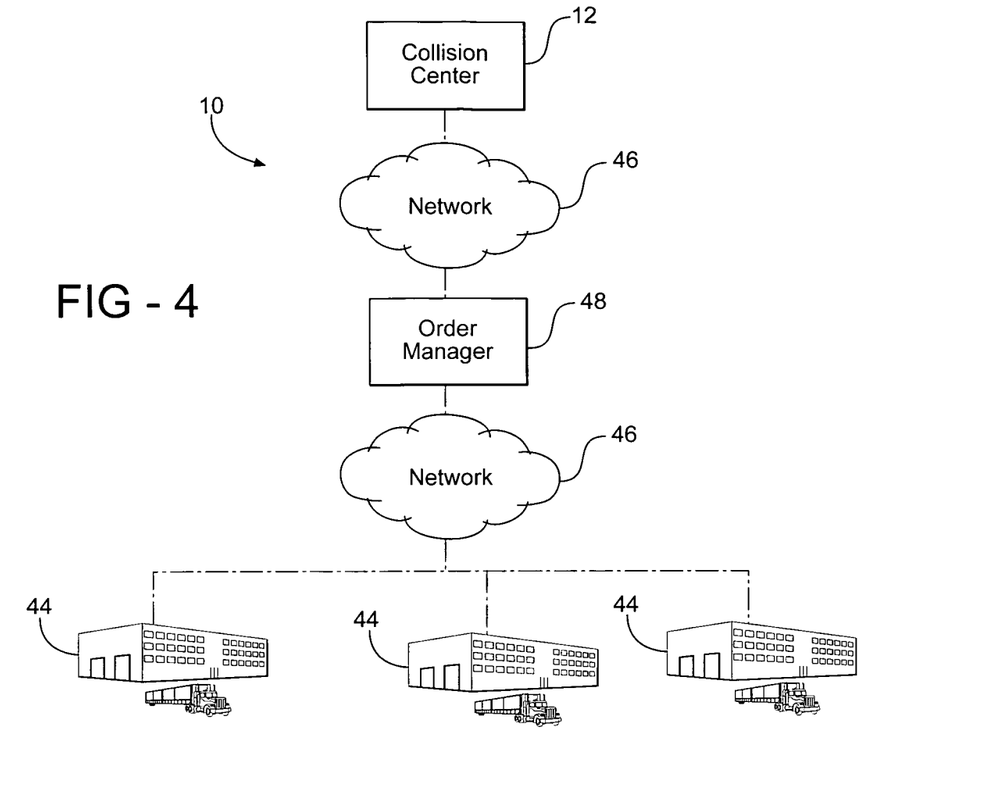
FIG. 4 is a schematic view of the system showing an order manager and a plurality of suppliers.
Figure 5:
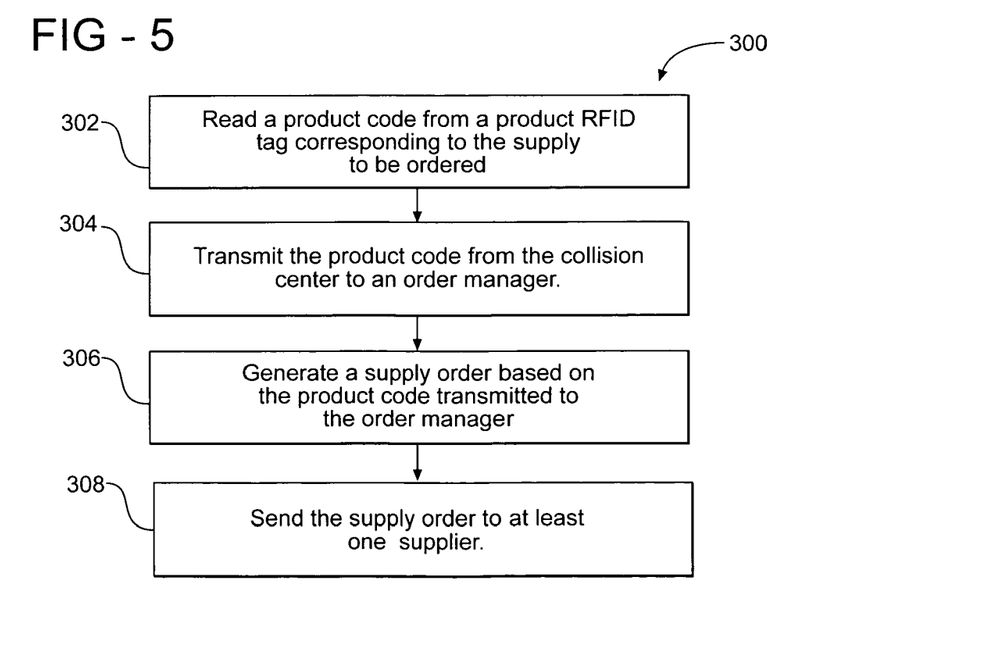
FIG. 5 is a block diagram of the steps of a third method of the subject invention.

Referring to FIGS. 4 and 5, the subject invention also provides a third method 300 for ordering a supply of products for the collision center from at least one supplier. In contrast to the first and second methods 100, 200, the third method 300 is used to create a "spot order" of supplies for the collision center 12, regardless of the inventory level or the inventory database. Said another way, the third method 300 allows for an immediate replenishment of supplies.

The third method 300 includes the step of reading 302 the product code from the product RFID tag. The product code and product RFID tag corresponds the supply to be ordered. Of course, a plurality of product codes may be read from a plurality of product RFID tags to order different products or a higher quantity of a single product. Preferably, the RFID tag is read with a handheld, wireless RFID tag reader. Alternatively, stationary RFID tag readers may also be utilized, such as a stationary RFID tag reader mounted near a storeroom door in the collision center 12.

The third method 300 continues with the step of transmitting 304 the product code from the collision center to an order manager 48. Preferably, the order manager 48 is a third-party independent from the collision center 12 and the supplier 44. Alternatively, the role of order manager 48 may be fulfilled by the supplier 44 or the collision center 12. The order manager 48 may accommodate a plurality of suppliers 44 by maintaining databases containing the supplies provided by each of the suppliers 44. The product code may be transmitted from the collision center to the order manager through the network 46, such as the Internet. The network 46 may be a hard-wired network or a wireless network as described above and well known to those skilled in the art.

The third method 300 continues by generating 306 a supply order based on the product code, or codes, transmitted to the order manager 48. Multiple supply orders, each directed towards a different supplier 44, may be generated depending on the supplies provided by different suppliers 44.

Next, the supply order, or multiple supply orders, is transmitted 308 to the at least one supplier 44 or multiple suppliers 44. The supply order is preferably transferred electronically from the order manager to the supplier 44 or suppliers 44 via the network 46, such as the Internet. Of course, as mentioned above, numerous other techniques are available to transmit the supply order to the supplier 44. Also, those skilled in the art realize that the network 46 allowing communication between the collision center 12 and the order manager 48 may or may not be separate from the network 46 allowing communication between the order manager 48 and the suppliers 44.

The first, second, and third methods 100, 200, 300 described above list the progression of steps in the order of the preferred embodiment. Of course, the steps may be performed in alternative orders in alternative embodiments.

Obviously, many modifications and variations of the present invention are possible in light of the above teachings. The invention may be practiced otherwise than as specifically described within the scope of the appended claims.

What is claimed is:

1. A method of computing performance in a collision center comprising the steps of:
    removing at least one product from a supply of products for use by a technician in repairing a vehicle;
    electronically reading a product code corresponding to a type and/or a quantity of each product removed from the supply of products;
    electronically reading a repair order code corresponding to a repair order for the vehicle under repair wherein the repair order includes a description of repairs to be performed;
    electronically reading a technician code corresponding to the technician using the at least one product to repair the vehicle;
    transmitting the codes to a computer having a database;
    retrieving a standard benchmark indicating type and/or quantity of each product recommended to perform repairs described in the repair order from the database; and
    computing a performance level of the technician by the computer comparing the type and/or quantity of each product used by the technician to the standard benchmark.

2. A method as set forth in claim 1 wherein said step of electronically reading the product code is further defined as electronically reading the product code from a product radio-frequency identification (RFID) tag corresponding to the product.

3. A method as set forth in claim 1 wherein said step of electronically reading the product code is further defined as electronically reading the product code from a product barcode corresponding to the product.

4. A method as set forth in claim 1 further comprising the step of computing an inventory level of each product of the supply of products.

5. A method as set forth in claim 1 further comprising the step of computing a product cost for the repair order.

6. A system for measuring performance in a collision center comprising:
    an identification reader for reading a product code from a product identification corresponding to a type and/or a quantity of a product removed from a supply of products, a repair order code from a repair order identification corresponding to a repair order of a vehicle under repair, and a technician code from a technician identification corresponding to a technician using the product to repair the vehicle;
    a repair order database for storing repair orders which each include repairs to be performed to the vehicle;
    a benchmark database for storing standard benchmarks indicating type and/or quantity of each product recommended to perform repairs described in each repair order;
    a computer in communication with said identification reader and said databases for receiving said codes from said identification reader and computing a performance level of the technician by comparing the type and/or quantity of each product used by the technician to the standard benchmark.

7. A system as set forth in claim 6 further comprising an inventory database in communication with said computer for storing inventory levels corresponding to each product in the supply of products.

8. A system as set forth in claim 6 wherein at least one of said identifications is further defined as a radio frequency identification (RFID) tag and wherein said identification reader is further defined as an RFID reader capable of reading data from said RFID tag.

9. A system as set forth in claim 6 further comprising a wireless network facilitating communication between said identification reader and said computer.

* * * * *